United States Patent [19]

Knowles

[11] Patent Number: 4,983,818

[45] Date of Patent: Jan. 8, 1991

[54] DATA ACQUISITION SYSTEM WITH LASER SCANNER MODULE

[75] Inventor: Carl H. Knowles, Moorestown, N.J.

[73] Assignee: Metrologic Instruments, Inc., Bellmawr, N.J.

[21] Appl. No.: 304,054

[22] Filed: Jan. 30, 1989

[51] Int. Cl.⁵ ............................................. G06K 7/10
[52] U.S. Cl. ................................... 235/472; 235/462; 235/461
[58] Field of Search ............... 235/467, 462, 472, 488; 250/566

[56] References Cited

U.S. PATENT DOCUMENTS

| | | | |
|---|---|---|---|
| 4,133,034 | 1/1979 | Etter | 235/472 X |
| 4,158,194 | 6/1979 | McWaters | 235/472 X |
| 4,387,297 | 6/1983 | Swartz et al. | 235/462 |
| 4,409,470 | 10/1983 | Shepard et al. | 235/472 |
| 4,460,120 | 7/1984 | Shepard et al. | 235/472 |
| 4,575,625 | 3/1986 | Knowles | 235/467 |
| 4,607,156 | 8/1986 | Koppenaal et al. | 235/472 |
| 4,621,189 | 11/1986 | Kumar et al. | 235/472 |
| 4,706,248 | 7/1988 | Swartz et al. | 235/472 |
| 4,825,057 | 4/1989 | Swartz | 235/472 |

*Primary Examiner*—Harold Pitts
*Attorney, Agent, or Firm*—Caesar, Rivise, Bernstein, Cohen & Pokotilow, Ltd.

[57] ABSTRACT

A data acquisition laser scanner system. The system includes a laser scanner module and a data acquisition terminal. The data acquisition terminal comprises a housing, manual input means to input data therein, display means, and means for storing electrical signals. The module comprises a housing having a window, a source of laser light, a mechanism for sweeping the laser beam within the housing to produce a scan pattern comprising at least one line, a reflective beam folding system for projecting the pattern out of the window and onto an object, such as a bar code, and a system for receiving light reflected off the object to convert the reflected light into electrical output signals indicative thereof. The module also includes a connector for releasable securement to a mating connector forming a portion of the data acquisition terminal for mounting the module thereon and carrying the electrical output signals thereto.

18 Claims, 2 Drawing Sheets

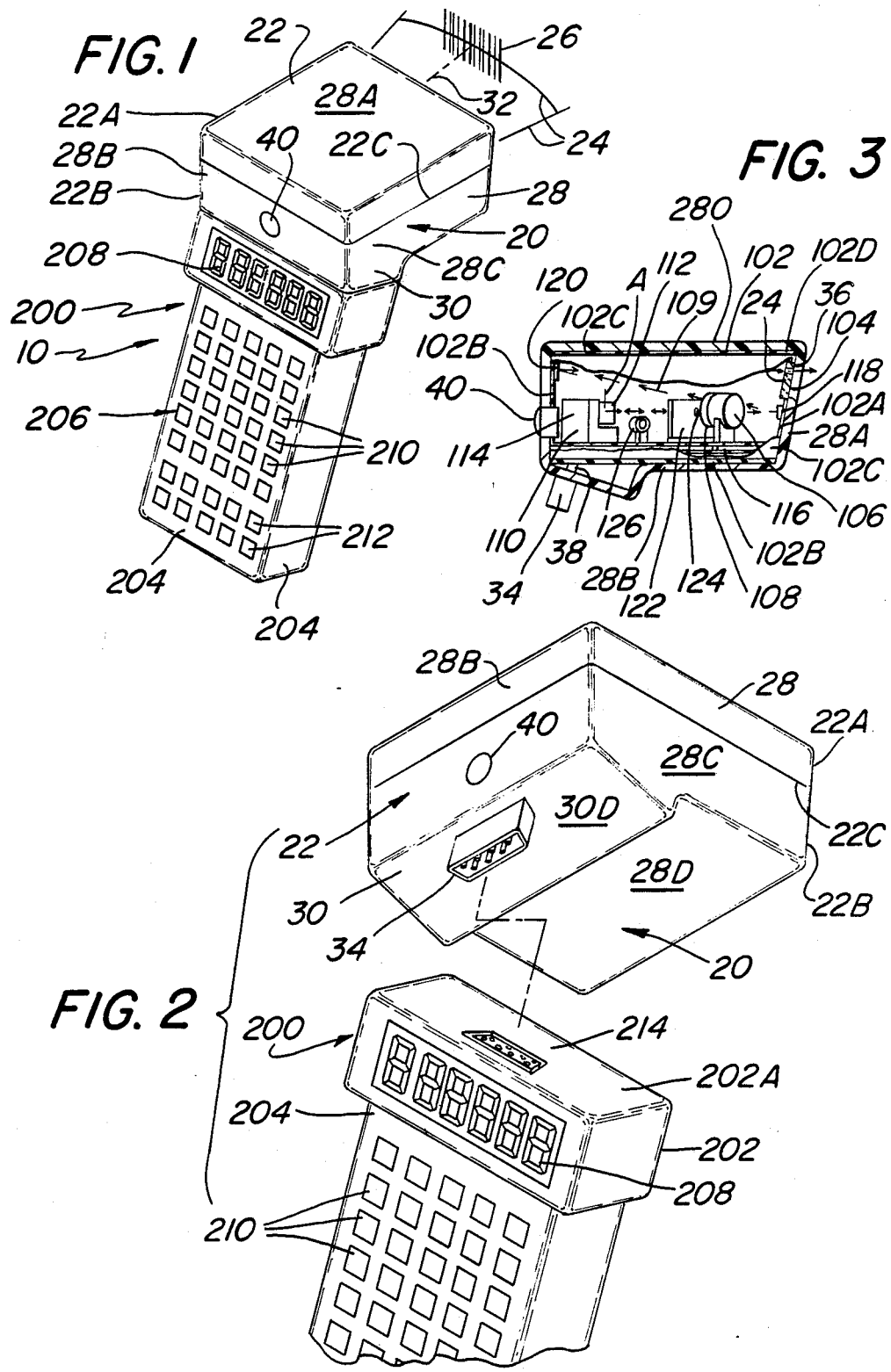

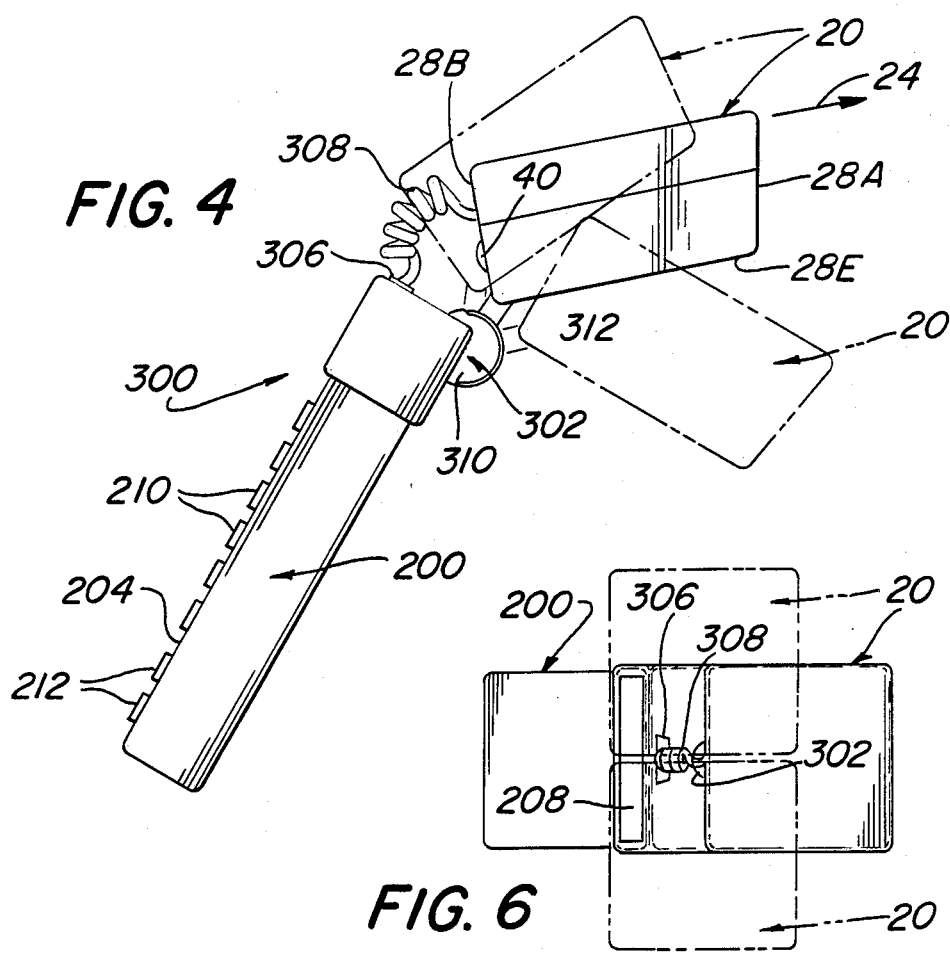
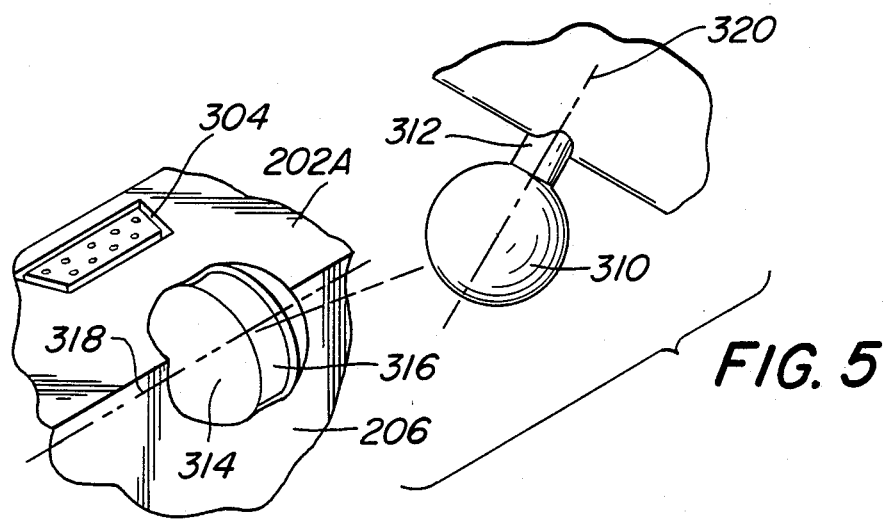

DATA ACQUISITION SYSTEM WITH LASER SCANNER MODULE

BACKGROUND OF THE INVENTION

This invention relates generally to portable data acquisition systems and more particularly to systems employing bar code reading devices.

It is a growing practice in many retail businesses to utilize portable data terminals to expedite the taking of inventory. Such devices are typically microprocessor based units which are housed in a relatively small case so that they can be readily held in one's hand. In order to enable desired data, e.g., the identity of a particular item, its quantity, etc., to be entered into the device for storage and subsequent use, data terminals usually include a plurality of alpha-numeric keys on the case. In addition it is typical for such data terminals to include an alpha-numeric display, e.g., LED or LCD, for displaying the data which has been entered/stored, and communication means, e.g., a modem and associated interface, for enabling the uploading/downloading of data between the terminal and some peripheral device, e.g., a host computer.

Portable data terminals of the above type are commercially available from various companies, such as Telxon Corporation, of Akron Ohio, and Hand-Held Products, Inc., of Charlotte, N.C.

In order to mechanize the input of some data, e.g., information typically contained in a bar code, such as the Universal Product Code (UPC), some data terminals include means for mounting a bar code reading device, such as a light pen or wand, thereon to form a bar code reading, data acquisition terminal. One such a hand-held data terminal is shown and described in U.S. Pat. No. 4,621,189 (Kumar et al). Mechanized entry of bar code data into such devices is accomplished by drawing the light pen portion of the terminal across a bar code. While the use of a light pen input for a portable data terminal does, in fact, speed up the data entry process, it nevertheless still leaves much to be desired from the standpoint of ease of use, e.g., a light pen or wand requires contact with the bar code to be read. That characteristic renders wands/light pens of little use in applications, e.g., warehouses, store rooms, where the bar code is located some distance away so that the wand/scanner cannot be easily brought into contact with the code to read it. Light pens/wands also suffer from other well known disadvantages.

Numerous portable or hand-held laser scanners which do not require contact with the bar code to be read have been disclosed in the patent literature and many are commercially available. Such devices obviate many of the disadvantages of light pens/wands and are typically composed of a relatively small, light weight, scanning head. The head is arranged to be held in the users hand for projecting a laser beam generated scan pattern onto a bar code at which the head is aimed. This action illuminates the bar code. The head also includes means to process the light reflected off the bar code to convert it into an electrical signal indicative of the bar codes bars and spaces. These signals are decoded either in the head or in a console unit to which the head is connected effect the "reading" of the bar code. For example, in U.S. Pat No. 4,575,625, of which I am the inventor, and which is assigned to the same assignee as this invention, there is disclosed one such hand-held laser scanner. That scanner is a completely self-contained unit in that it includes laser scanning means and power supplies, a decoding computer to provide a signal indicative of the information contained in the bar code, and communication capabilities to enable the uploading/ downloading of data to and from the scanner. Thus, the scanner includes, among other things, a laser tube and an associated optic bench assembly. The laser tube produces a laser beam which is directed to a rotating reflective polygon. The polygon is rotated by an associated motor assembly. The laser beam is swept by the rotating polygon through a predetermined arc and is directed out through a window in the housing to sweep across a bar code located opposite the window. A photo detector located within the housing receives the light reflected off of the bar code and converts that light into an electrical signal which is amplified and processed by an associated amplifier and signal processing circuitry, also located within the scanner. The scanner also includes a low voltage power supply, a microprocessor and associated circuitry, a high voltage power supply, a releasable input/output cable connector or plug, an associated input/output cable, and an on/off trigger assembly.

In my co-pending U.S. patent application Ser. No. 07/128,299, filed on Dec. 3, 1987, now U.S. Pat. No. 4,805,175, Feb. 14, 1989, entitled Ultra Compact, Hand-Held Laser Scanner, which is assigned to the same assignee as this invention, there is disclosed an even more compact hand-held scanner. That scanner basically comprises a laser tube and associated high voltage power assembly (or in an alternative embodiment a semi-conductor laser diode and associated supply and control means), beam folding and sweeping optics, a motor sub-assembly, a photo detector and associated amplification and signal processing circuit sub-assembly, a releasable input/output cable connector or plug, an associated input/output cable, and an on/off trigger assembly, all housed within an extremely compact and ergonomically designed housing. The housing includes a short snout or body portion in which a window through which the laser beam and the reflected light passes, and a supporting, hand-grip portion arranged to be held within the user's hand. The housing's construction enhances the balance point of the device by putting its center of gravity in the operator's hands so that it can be held comfortably for long periods of time without operator fatigue.

Examples of other hand-held laser scanners have been disclosed in the following patent literature: U.S. Pat. Nos. 4,387,297 (Swartz et al.), 4,409,470 (Swartz et al.), 4,460,120 (Shepard et al.), 4,607,156 (Koppenall et al.) and 4,760,248 (Swartz et al).

Some prior art hand-held scanners include on the scanning head a keyboard or other means for manually inputting of data therein. Thus, such devices serve as a bar code scanning, data acquisition system.

While prior art hand-held scanning devices may be sufficiently compact and light weight to be held in one's hand for use, nevertheless all still leave something to be desired from the standpoint of size and ability to be mounted onto a conventional data terminal to form a bar code scanning, data acquisition system. However, in my copending U.S. patent application Ser. No. 07/299,998, filed on Jan. 23, 1989, now U.S. Pat. No. 4,962,980, Oct. 16, 1990, entitled Laser Scanner Engine with Folded Beam Path, which is assigned to the same assignee as this invention and whose disclosure is incorporated by reference herein, there is disclosed and claimed a modular scanner ("engine") which is extremely compact in size and suitable for use in various types of scanning systems.

OBJECTS OF THE INVENTION

Accordingly, it is a general object of this invention to provide a portable data acquisition/laser scanning system including a modular scanner constructed in accordance with the teachings of my aforementioned patent application.

It is a further object of this invention to provide a portable data acquisition/laser scanning system which is arranged to be readily held in one's hand to scan a bar code for mechanized data entry or to enable the manual input of data by keyboard entry.

It is a further object of this invention to provide a laser scanning module which includes means to enable it to be readily mounted onto a conventional portable data acquisition terminal to form a portable bar code scanning, data acquisition system.

It is yet another object of this invention to provide a laser scanning module which is compact in size and light in weight and which when mounted onto a conventional portable data acquisition terminal forms a bar code scanning, data acquisition system suitable for being held in one's hand for use.

SUMMARY OF THE INVENTION

These and other objects of the instant invention are achieved by providing a data acquisition scanning system. The system comprises a laser scanner module which is releasably secured to a portable data terminal. The data terminal comprises a first housing arranged to be held in one's hand, means for storing electrical input signals therein, and first connector means for connection to bar code reading means. The scanner module comprises a second housing including a window, beam sweeping means for sweeping a laser beam from a predetermined point within the second housing through a predetermined angle to produce a scan pattern comprising at least one line, and beam folding means projecting the scan pattern out of said window. The beam folding means is located between the beam sweeping means and the window for folding the path of the beam within the second housing. The module additionally comprises second conductor means and signal processing means connected thereto for producing first electrical signals indicative of the symbol scanned. The second connector means is arranged for releasable securement to the first connector means to mount the module on the data terminal and to carry the first electrical signals thereto.

DESCRIPTION OF THE DRAWING

FIG. 1 is a perspective view of a portable data acquisition scanner system constructed in accordance with the subject invention;

FIG. 2 is an enlarged, exploded perspective view, of a portion of the system shown in FIG. 1;

FIG. 3 is a side elevational view, partially in section, of a portion of the system shown in FIG. 1;

FIG. 4 is a side elevational view of an alternative embodiment of this invention;

FIG. 5 is an exploded perspective view of a portion of the embodiment shown in FIG. 4; and FIG. 6 is a top plan view of the embodiment of FIG. 4.

DETAILED DESCRIPTION OF THE PREFERRED EMBODIMENT

Referring now to various figures of the drawing wherein like reference characters refer to like parts there is shown in FIG. 1 one embodiment 10 of a portable data acquisition scanner system constructed in accordance with this invention. The system 10 is a complete system in that it enables either the manual, e.g., keyboard, or mechanized, e.g., laser scanner, entry of data therein. Thus, the system 10 basically comprises a laser scanner 20 and a data acquisition terminal 200.

The scanner 20 comprises a housing or enclosure 22 in which is located a scanning module or engine 100 which is constructed in accordance with the teachings of my aforenoted patent application and will be described in detail later. Suffice it for now to state that the module 100 is constructed and arranged to produce a single line laser scan pattern 24 and to project it out through a window (to be described later) onto a bar code 26 which is held opposite the window. The module 100 receives the light reflected off of the bar code, converts that light into electrical output signals indicative of the bar code and provides those signals to means, in this case to decoding and data storage means in the portable data terminal 200, for processing.

The terminal 200 is a conventional hand-held, data entry apparatus, and is thus arranged to have data input therein, either through manual, e.g., keyboard, entry or mechanized, e.g., electrical, entry. One such terminal is shown in U.S. Pat. No. 4,621,189, whose disclosure is incorporated by reference herein. That terminal is merely exemplary. Thus, other conventional hand-held, data entry apparatus or terminals can be used in lieu of terminal 200.

The data terminal 200 basically comprises a body portion in the form of a housing 202 which is arranged to be held in one's hand with its front surface 204 facing up. The housing includes a keyboard 206 located on the front surface to facilitate the manual entry of data into the terminal. A multicharacter alpha-numeric display 208, such as a dot matrix LCD or LED display, is provided on the front face of the housing adjacent the top end. The display provides as visual indication of terminal data to facilitate the use of the device.

All of the operative components forming the terminal are located within the interior of the housing 202. Those components are a microprocessor and supporting logic means, program memory means (e.g., ROM), data memory means (e.g., RAM), display driver means, communication means (e.g., a modem and associated interface), and power supply and associated power control means. All of those components are conventional and hence are not shown or described herein in the interest of brevity. Suffice it to state that the terminal's memory means may include any software (programs) for its microprocessor to utilize to perform any desired specific application. Thus, inasmuch as the terminal 200 is arranged to be used with some bar code reading device, the terminal's microprocessor is arranged and programmed to process (decode) the electrical output signals from the bar code reading device (and which signals usually merely comprise digital representations of the bars and spaces of the code scanned).

Information (e.g., data or instructions) may be provided to the terminal's microprocessor from either the keyboard 206, the scanning module 100, or downloaded from a remote peripheral device, e.g., a host computer (not shown), via the modem/interface means. Moreover, data or instructions may be uploaded to the peripheral device from the terminal 200.

The manual entry of data or instructions to the terminal 200 is effected by use of the keyboard 206. As can be seen the keyboard includes a plurality of depressible keys, such as keys 210 for the entry of alphanumerical data, and keys 212 for the entry of functional commands. Thus, by the appropriate depression of the keys the terminal may be instructed to save data regarding the quantity of specific products presently in inventory. The identification and counting of the individual products can be accomplished by the scanner 100, as will be described later and assuming, of course, that the products being counted bear bar codes or other scanner readable symbols.

At the top of the terminal is a conventional electrical connector 214 (FIG. 2). The connector shown herein is merely exemplary and any conventional type electrical connector which normally serves as the mount/electrical connection for any suitable wand or light pen reader can be used. In accordance with the teachings of this invention the connector 214 serves as the mechanical/electrical connection for the laser scanner 20 to the data terminal 200.

As described in my aforenoted application the scanner module or "engine" 100 is itself self-contained within a very compact, e.g., 1 inch by 1.5 inches by 0.75 inch, parallelopiped shaped enclosure 102 (FIG. 3).

The scanner engine 100 is disposed within the module's housing 22. Thus, before discussing the details of the module 100 a description of the housing 22 is in order. To that end, as can be seen in FIGS. 1-3, the housing includes a body portion 28 and a base portion 30. The body portion is of generally parallelopiped shape having a front wall 28A, a rear wall 28B, a pair of side walls 28C, a top wall 28D and a bottom wall 28E. A longitudinal axis 32 extends through the body portion parallel to the planes of the side walls, bottom wall and top wall, and is spaced close to the top wall. The body portion's walls define a hollow cavity in which the scanner module 100 is mounted. The scanner's base portion 30 projects downward from the side walls 28C, rear wall 28B and bottom wall 28D, and includes a bottom wall 30D. The bottom wall 30D extends at an angle to the rear wall 28B and is arranged to be disposed on the top wall 202A of the terminal 200 so that the longitudinal axis 32 of the body portion of the scanner 20 extends at an obtuse angle to the terminal when the scanner is mounted thereon. This orientation facilitates the aiming of the scan pattern 24 onto a bar code 26.

The front wall 28A of the housing includes an opening 36 extending virtually the entire width of the housing and disposed immediately below the top wall 28A. The axis 32 extends through the opening 36 close to its top edge.

As can be seen in FIG. 2, a plug 34 is mounted on the bottom wall 30D of the scanner 20. This plug is a conventional device which serves as the mechanical and electrical connection to the data terminal 200. Thus, plug 34 is constructed to mate with socket 214 of the terminal. The plug 34 is electrically interconnected via a cable (to be described later) to the scanner engine 100.

In the interest of ease of assembly of the scanner 20, its housing 22 is formed of two molded, e.g., plastic, components, namely an upper shell 22A and a lower shell 22B. When the two shells are assembled together along seam line 22C, they complete the housing 22. The shells can be readily disassembled to enable ready access to the scanner engine 100 located in the interior of the housing 22. This action thereby facilitating manufacture of the scanner and subsequent servicing of its engine.

The engine's enclosure 102 includes a front wall 102A, a rear wall 102B, a pair of side walls 102C, a top wall 102D, and a bottom wall 102E. The front wall 102A of the module 100 includes a rectangularly shaped window 104 extending virtually the entire width of the enclosure 102 and located immediately adjacent its top wall 102D.

The laser light source and all of the associated optical, mechanical, and electrical components to produce the laser beam scanning pattern 24, to project it out of the window 104 onto the bar code 26, and to sense the light reflected off of the bar code to produce the digital output signals, are all located within the engine's enclosure 102. The components forming the laser, its focusing optics, and the electrical components forming the reflected light receiving means and associated signal processing circuitry are conventional, and hence, will only be described generally herein. Thus, the engine 100 comprises a conventional semiconductor laser diode 106 and associated optical means 108. The optical means 108 comprises a lens system, not shown, mounted on the front of the laser diode for focusing the beam produced by the diode into the desired spot size. The focused beam, denoted by the reference numeral 109, is then directed to beam sweeping means 110 which serves to sweep the focused beam through a predetermined arc, about an axis A to produce the scan pattern 24. That pattern consists of a single, straight line when projected onto a plane and extends across substantially the entire width of the window 204.

The line scan pattern 22 exits the window 104 on axis 32 immediately below the top wall 28A of the scanner. The latter feature facilitates the aiming of the pattern onto a bar code since the top of the scanner will not block the viewer's line of sight to the scan pattern and, hence, the symbol onto which it is projected.

The beam sweeping means 110 is incorporated into the engine 100. The beam sweeping means basically comprises light reflective means 112 (e.g., a mirror), a motor (not shown), and a support structure 114.

The motor is preferably an electromagnet which is coupled to the mirror 112 to oscillate it about the axis A through a predetermined arc, e.g., $+/-7$ degrees, to produce the desired line pattern. In the preferred embodiment the mirror is concave, but can be any other suitable shape, e.g., planar. The mirror 112 is mounted on a pivot arm (not shown) which is pivotally mounted on the support structure 114 at the location of the pivot axis A. The pivot arm includes a permanent magnet mounted at its free end. The electromagnet motor comprises an coil of electrically conductive wire forming a central bore in which the permanent magnet is located. The coil is arranged to be connected to current supply means (not shown) for providing electrical current pulses of opposite polarity to it to produce alternating direction electromagnetic fields. This action causes the magnet to be pulled and pushed into and out of the bore, thereby causing the arm to oscillate about axis A.

The amount of excursion of the magnet into and out of the bore, and hence the angle of the mirror's oscillation about axis A, is established by the use of a pair of adjustable elastic stops or bumpers (not shown). In order to energize the coil a series of respective very short duration current initiation pulses are produced by control means (not shown) each time that the pivot arm has reached the end of its particular excursion. Sensor means (not shown) are provided at each bumper and are coupled to the control means to initiate the production of the current initiation pulses.

The alternate energization of the coil coupled with the operation of the elastic bumpers (e.g., the bumpers stop the excursion of the arm in one direction and due to their resiliency impart a force to the arm in the opposite direction) results in the controlled oscillation of the mirror. By controlling or adjusting the pulse width and/or magnitude of the current pulses provided to the motor one can control or adjust the velocity of the movement of the mirror 112.

The beam sweeping means 110 is mounted on a wall portion of the enclosure at the same elevation as the laser diode and associated focusing means so that the focused beam 109 is projected horizontally onto the oscillating mirror 112. The means for mounting the laser diode and associated focusing means comprises a printed circuit card 116 which is mounted within the bottom portion of the engine's housing 102.

The engine 100 also includes a beam folding system located downstream of the beam sweeping means 110 to fold the path of the beam 109 within the enclosure. In so doing the enclosure can be made very compact in size, as described earlier, while enabling the production of a wide, linear, scan pattern which can be used to scan large (wide) bar codes located close to the window as well as small (narrow) bar codes located far from the window, all without the need for complex signal processing and/or decoding means. To accomplish that end the beam folding system comprises a pair of reflecting surfaces, each in the form of an elongate mirror. In particular, a first mirror 118 is mounted on the interior surface of the enclosure's front wall at the same elevation as the oscillating mirror 112. The mirror 118 extends a substantial portion of the width of the front wall and includes a planar reflecting surface tilted upward at a slight acute angle, e.g., 4.8 degrees. Accordingly, the focused beam 109 is swept horizontally through the enclosure from an origin point (the point at which the focused beam impinges the oscillating mirror 112) to the upwardly angled reflecting surface of the mirror 118. The mirror 118 serves to reflect the swept beam (the line forming pattern 22) to another mirror 120 of the beam folding system. The mirror 120 is mounted on the inner surface of the enclosure's rear wall 102B at the same elevation as the window 104. The mirror 120 extends an even greater portion of the width of the enclosure than mirror 118 and includes a planar reflecting surface which is tilted downward at a slight acute angle, e.g., 4.8 degrees. Accordingly, the mirror 120 reflects the swept beam received from the mirror 118 horizontally through the enclosure coincident with axis 32 to the window 104, from which it exits through the housing's opening 36 to sweep across a bar code located on that axis opposite the window.

The traversal of the laser beam across the bar code symbol illuminates the symbol, whereupon light is reflected omnidirectionally off of the symbol. A portion of the reflected light, representative of the bars and spaces of the code, enters the window 104. The received light passes through the enclosure onto mirror 120 where it is reflected downward across the enclosure to mirror 118. Mirror 118 in turn reflects the incoming light horizontally to the oscillating mirror 112, from whence it is directed horizontally to a collecting mirror 122. The collecting mirror 122 is mounted in the enclosure directly in front of the beam focusing means 108. Thus, the collecting mirror includes an opening 124 through which the focused laser beam 109 passes enroute to the beam sweeping mirror 112.

The collecting mirror 122 basically comprises a concave, e.g., spherical, parabolic, etc., reflective surface for focusing the received light onto a conventional light-to-electrical transducer, e.g., phototransistor, 126. The phototransistor 126 is also mounted on the circuit board 116 in the enclosure opposite to the collecting mirror 122. Accordingly, light received by the phototransistor is converted into an electrical signal indicative of the bars and spaces of the symbol scanned. The phototransistor is coupled to conventional signal processing means (not shown) including a preamplifier, amplifier, and digitizer circuitry mounted on the circuit board 116. That circuitry produces the heretofore mentioned digital output signals, and such signals are provided via the cable 38 to connector plug 34 and from there to the decoding means, e.g., the microprocessor and associated logic circuitry, in the data terminal 200, via connector socket 214.

As is conventional in order to initiate the operation of the scanner, i.e., cause it to project the scan pattern out of it to sweep across a bar code at which the scanner is aimed, a manually actuatable member 40 is provided. In the preferred embodiment shown herein the member comprises a spring biased button which is located on the scanner's rear wall 28B adjacent the top of the terminal 200. Accordingly, when the system 20 is held in the operator's hand, the scanner 20 can be aimed at the bar code, and the actuating button 40 depressed, whereupon the scanning operation commences. The details of the button, its associated components and operation is conventional and thus will not be described herein in the interest of brevity.

It should be pointed out at this juncture that other types of laser beam generating devices can be used in lieu of the semiconductor laser diode described heretofore. Moreover, other beam sweeping means can be utilized to produce the scan pattern, and that pattern need not consist of only a single line.

In FIGS. 4-6 there is shown an alternative embodiment of this invention. In that embodiment the system is designated by the reference numeral 300 and basically comprises a scanner 20 and a data terminal 200. However, unlike system 10, the scanner 20 of this embodiment includes mounting means to enable it to be adjusted to various spatial orientations with respect to the terminal. This feature enables the scanner 20 to be oriented in the most desirable orientation for the particular user and scanning application. Examples of the adjustability of the scanner module with respect to the data terminal is shown by the phantom lines in FIGS. 4 and 6. Thus, as can be seen therein the module can be adjusted either up or down and/or side to side with respect to the terminal.

To accomplish the directional adjustability the system 300 makes use of a gimble mount 302 to mechanically support the scanner 20 on the data terminal 200. Since the scanner's orientation is adjustable, its housing 22 does not include the angled base portion 30 of the embodiment shown in FIG. 1. Thus, the housing 22 merely comprises a body portion 28. The electrical interconnection between the scanner and the data terminal is effected by an electrical connector socket 304

(FIG. 5) and an associated plug 306 (FIG. 4). The plug is located at the end of a coiled cable 308 which, like previously identified cable 38, carries the electrical signals to and from the scanner. As should be appreciated by those skilled in the art any suitable conventional electrical plug and socket can be utilized in lieu of the plug and socket shown herein.

The gimble mount is shown clearly in FIGS. 4 and 5 and basically comprises a ball 310 mounted on the end of an arm 312. The arm is fixedly secured to the housing 22 of the scanner at the interface of its rear wall 28B and bottom wall 28E. The ball 310 is adapted to be received within a split socket 314 fixedly secured to the top wall of the data terminal at its interface with the bottom surface 206. With the ball 310 in place in the socket 314 the arm 312 is located within a slot 316 so that the module can be rotated about an axis 318 (FIG. 5) to effect the up-down orientation of the scanner, with the extent of adjustability being established by the length of the arc of the slot 316, or about the longitudinal axis of the arm 312 to effect the side-to-side orientation of the module.

In view of the foregoing it should be appreciated by those skilled in the art that existing conventional data acquisition terminals can be readily converted (retrofit) into a laser scanning system by the releasable mounting of a scanner module constructed in accordance with this invention thereon. Alternatively new terminals may be designed and manufactured to take advantage of the scanner module of this invention so as to form a bar code scanning data acquisition system. The resulting system, whether formed by existing data terminals or future data terminals, nevertheless offers extensive functionality for widely varying data acquisition applications, yet is very compact and light in weight.

Without further elaboration the foregoing will so fully illustrate my invention that others may, by applying current or future knowledge, readily adapt the same for use under various conditions of service.

I claim:

1. A data acquisition scanning system comprising a laser scanner module releasably secured to a portable data terminal, said data terminal comprising a first housing arranged to be held in one's hand, means for storing electrical input signals therein, and first connector means for connection to bar code reading means, said scanner module comprising a second housing which is very compact in size and includes a window, beam sweeping means located within said second housing for sweeping a laser beam from a predetermined point within said second housing through a predetermined angle to produce a scan pattern comprising at least one line, and beam folding means projecting the scan pattern out of said window, said beam folding means being located between said beam sweeping means and said window for folding the path of the swept beam within said second housing, said module additionally comprising second conductor means and signal processing means connected thereto for producing a first electrical signal indicative of the code scanned, said second connector means being arranged for releasable securement to said first connector means to mount said module on said data terminal and to carry said first electrical signal thereto.

2. The system of claim 1 wherein said module includes means for initiating a scanning operation.

3. The system of claim 1 wherein said data terminal comprises manually actuatable means to input data therein.

4. The system of claim 1 wherein said data terminal comprises display means.

5. The system of claim 3 wherein said data terminal comprises display means.

6. The system of claim 5 wherein said module includes means for initiating a scanning operation.

7. A laser scanner module for releasable securement to a portable data terminal to form a data acquisition scanning system, said data terminal comprising a first housing arranged to be held in one's hand, means for storing electrical input signals therein, said first connector means for connection to bar code reading means, said scanner module comprising a second housing including a window, beam sweeping means for sweeping a laser beam from a predetermined point within said second housing through a predetermined angle to produce a scan pattern comprising at least one line, beam folding means projecting the scan pattern out of said window, and means for enabling the orientation of said module to be adjusted with respect to said data terminal, said beam folding means being located between said beam sweeping means and said window for folding the path of the beam within said second housing, said module additionally comprising second conductor means and signal processing means connected thereto for producing first electrical signals indicative of the code scanned, said second connector means being arranged for releasable securement to said first connector means to mount said module on said data terminal and to carry said first electrical signals thereto.

8. The system of claim 7 wherein said orientation can be adjusted up/down and/or side-to-side.

9. The system of claim 8 wherein said last mentioned means comprises gimble means.

10. A laser scanner module for releasable securement to a portable data terminal to form a data acquisition scanning system, said data terminal comprising a first housing arranged to be held in one's hand, means for storing electrical input signals therein, and first connector means for connection to bar code reading means, said scanner module comprising a second housing which is very compact in size and includes a window, beam sweeping means for sweeping a laser beam from a predetermined point within said second housing through a predetermined angle to produce a scan pattern comprising at least one line, and beam folding means projecting the scan pattern out of said window, said beam folding means being located between said beam sweeping means and said window for folding the path of the swept beam within said housing, said module additionally comprising second conductor means and signal processing means connected thereto for producing a first electrical signal indicative of the code scanned, said second connector means being arranged for releasable securement to said first connector means to mount said module on said data terminal and to carry said first electrical signal thereof.

11. The module of claim 10 wherein said data terminal means for initiating a scanning operation.

12. The module of claim 10 wherein said data terminal comprises manually actuatable means to input data therein.

13. The system of claim 10 wherein said data terminal comprises display means.

14. The system of claim 12 wherein said data terminal comprises display means.

15. The system of claim 14 wherein said module includes means for initiating a scanning operation.

16. A laser scanner module for releasable securement to a portable data terminal to form a data acquisition scanning system, said data terminal comprising a first housing arranged to be held in one's hand, means for storing electrical input signals therein, and first connector means for connection to bar code reading means, said scanner module comprising a second housing including a window, beam sweeping means for sweeping a laser beam from a predetermined point within said second housing through a predetermined angle to produce a scan pattern comprising at least one line, beam folding means projecting the scan pattern out of said window, and means for enabling the orientation of said module to be adjusted with respect to said data terminal, said beam folding means being located between said beam sweeping means and said window for folding the path of the beam within second housing, said module additionally comprising second conductor means and signal processing means connected thereto for producing first electrical signals indicative of the code scanned, said second connector means being arranged for releasable securement to said first connector means to mount said module on said data terminal and to carry said first electrical signals thereto.

17. The system of claim 16 wherein said orientation can be adjusted up/down and/or side-to-side.

18. The system of claim 17 wherein said last mentioned means comprises gimble means.

* * * * *